May 27, 1941.  F. E. SETTE  2,243,443
MIXER
Filed April 12, 1939   2 Sheets-Sheet 1

INVENTOR
FREDERICK E. SETTE
BY
Wheeler, Wheeler & Wheeler
ATTORNEYS.

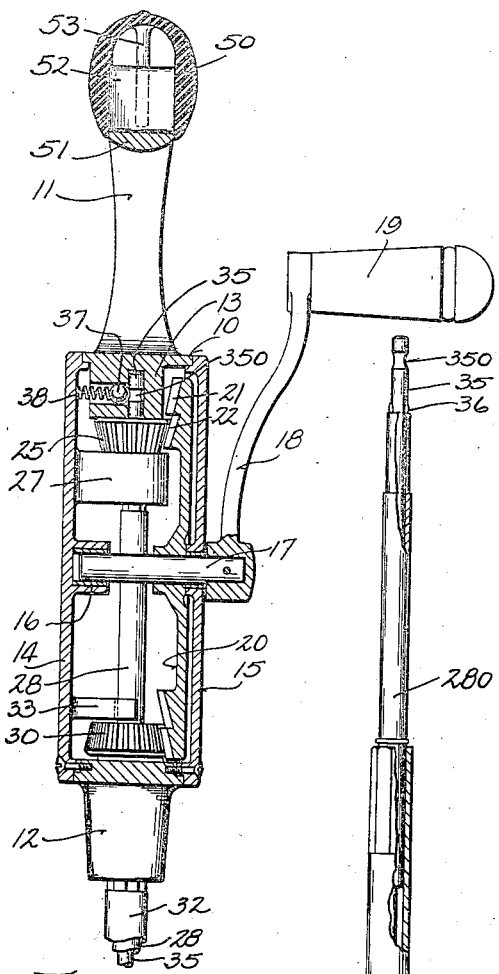

Patented May 27, 1941

2,243,443

UNITED STATES PATENT OFFICE 2,243,443

MIXER

Frederick E. Sette, Oakland, Calif.

Application April 12, 1939, Serial No. 267,373

9 Claims. (Cl. 259—132)

This invention relates to improvements in mixers.

It is the primary object of the invention to provide a light, strong, manually operable mixer and beater, particularly designed for the preparation of foods but adaptable for other purposes and so arranged as to operate a series of mixing or beating members at differing speeds.

It is a further object of the invention to provide in a device of this character a relatively stationary support extending through one or more driven shafts to engage the bottom of the receptacle in which the beater is operative, and thereby to assist in positioning the beater as well as to protect the beating members from injury through contact with the receptacle.

It is a further object of the invention to provide a device in which a plurality of driven shaft assemblies are interchangeably engageable with driven pinions operating at differing speeds in an organization such that one or more beater mechanisms propelled by said shaft assemblies may be operated at different speeds or different directions or both, according to which such assembly is engaged with the gears.

It is another object of the invention to provide a novel and improved handle construction facilitating the assembly of a plastic handle upon another support which coacts with the plastic to complete the handle.

Finally, it is a very important object of the invention to provide a novel and effective organization in which the driving shaft for the beater is provided with bearings at each side of the driving gear and the driven shaft passes the driving shaft in offset relation and is provided with bearings at each side of the driving shaft. In this connection it is also one of my objectives to provide a beater frame, shaft assembly, and gear set, so devised as to permit of the manufacture of a beater having bearings as aforesaid.

Other objects will be apparent to those skilled in the art from a reading of the following disclosure of my invention.

In the drawings:

Figure 5 is a detail view taken in section on the line 5—5 of Fig. 2.

Figure 6 is a plan view of the lower end of the apparatus, the shaft assembly being shown in transverse section.

Figure 7 is a view partially in side elevation and partially broken away to longitudinal section through one of the substitute shaft assemblies.

Figure 8 is a view taken on line 8—8 of Fig. 7.

Figure 9 is a view in side elevation of another substitute shaft assembly.

Like parts are identified by the same reference characters throughout the several views.

Figure 1:
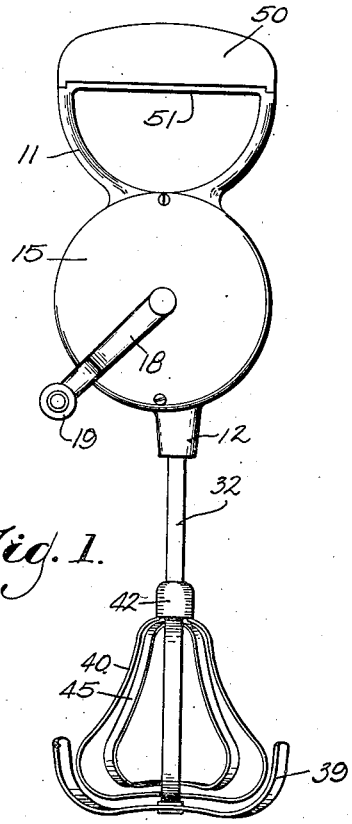
Figure 1 is a side elevation of the beating and mixing device embodying the invention.

The main frame of the device comprises an annular body portion 10 which may be die cast or otherwise formed to provide, preferably integrally, a D-shaped handle element 11, bearing sleeve 12, and internal bearing boss 13.

Two separately constructed closure disks 14 and 15 flanged to engage the inner periphery, as well as the end faces of the annular frame 10, are screwed to the opposite sides of the frame as shown in Fig. 5. It is important to the assembly of the parts that each of these disks be made independent of the frame.

Closure disk 15 is provided with a bushed bearing opening and closure disk 14 is provided with a bushed bearing boss at 16 for the drive shaft 17 which, in the present hand driven device, carries a crank at 18 with a handle 19 for its manual operation. Within the case a duplex driving gear 20 is mounted on the drive shaft 17 and carries two sets of helicoidal teeth 21 and 22, the teeth of each set being preferably somewhat beveled, as clearly shown in Fig. 5.

Figure 3:
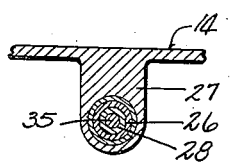
Figure 3 is a detail view taken in section on the line 3—3 of Fig. 2.

Meshing with the inner row of teeth at 22 is a driven pinion 25 having a tubular extended hub portion 26 journaled in a bushing which is pressed into a boss 27 carried by the closure plate 14 of the casing. The interior of the tubular hub portion 26 is not cylindrical but is polygonal as shown in Fig. 3 to receive and drive the correspondingly formed end of a driven shaft 28, such shaft being preferably tubular. The pinion 25 is assembled in boss 27 of cover plate 14 prior to the application of the cover plate to the annular frame 10. When the cover plate is secured to the frame the top of the pinion is engaged by boss 13 of the frame to hold the pinion securely in its bearing against axial displacement therefrom.

Figure 4:
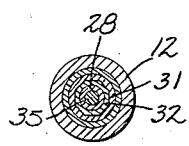
Figure 4 is a detail view taken in section on the line 4—4 of Fig. 2.

Meshing with the outer row of helicoidal teeth 21 of the driving gear 20 is another pinion 30 disposed near the lower end of the frame and provided with a tubular extended hub portion 31 journaled in a bushing which is pressed into the bearing sleeve extension 12 of the annular frame of the device. The interior surface of the tubular hub extension 31 of pinion 30 is not cylindrical but is polygonal as shown in Fig. 4 to engage the correspondingly formed terminal portion of a driven shaft 32. Shaft 32 is tubular and bears externally upon driven shaft 28 through pinion 25 as already described.

The driven pinion 30 is positioned in its bushing in the annular frame 10 before the application of cover plate 14 to the frame. Cover plate 14 carries a thrust bearing fork 33 which projects about shaft 28 into a position above pinion 30 so that when the parts are assembled this fork restrains the pinion from axial displacement from its bushing. Extending through the interior of the driven shaft 28 is a rod 35 having lugs at 36 to engage the upper end of the shaft 28 to restrain the parts against axial displacement. Beyond such lugs the shaft 35 is provided with an annular groove at 350 releasably engaged by a ball detent 37 disposed in a transverse opening in the boss 13 of the frame. A spring at 38 is engaged by cover plate 14 to hold the ball against the groove 350 to yieldably restrain the rod in boss 13 against accidental withdrawal therefrom. The restraint afforded this detent holds the polygonal ends of the several driven shafts releasably in engagement with their respective gears, the whole shaft and rod assembly being subject to withdrawal as a unit from the driving head.

At the lower end of the rod and shaft assembly the rod 35 is provided with a relatively stationary terminal baffle 39. This baffle provides support for the beater from the bottom of a container when the beater is in use. The baffle also protects the mixing or beating elements from contact with the sides of such a container and the baffle also prevents the material upon which the beating or mixing plates are acting from moving bodily with such blades. Thus the beating or mixing action is materially accelerated.

One set of mixing blades 40 is connected to the driven shaft 32. The lower end 41 of such shaft preferably carries a ferrule 42 die cast to provide a channel of square outline in which the ends of the several straps constituting the beater 40 are held flat as shown in Fig. 6 by compression of the ferrule thereon. At their lower ends such straps are pierced at their point of intersection by an eyelet at 43 which bears loosely on the rod 35 to receive bearing support therefrom.

Figure 2:
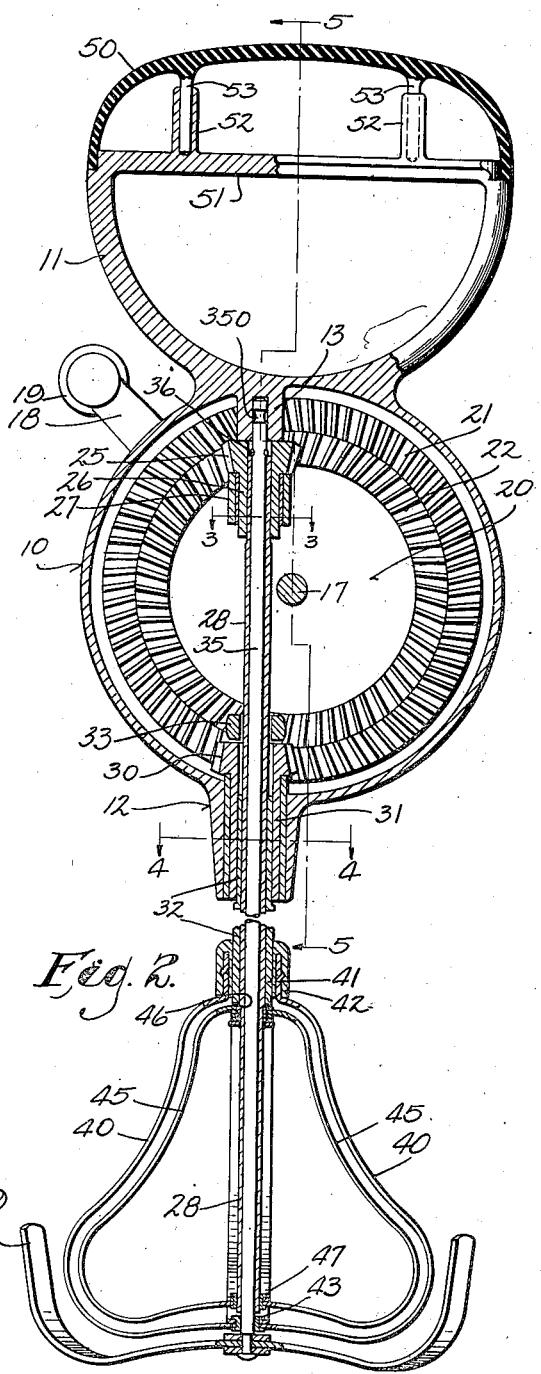
Figure 2 is a longitudinal section through the device on an enlarged scale, portions being broken away.

Within the set of beating or mixing blades 40 I provide an inner set of beating or mixing blades 45 mounted on the tubular shaft 28 in the manner shown in Fig. 2. Shaft 28 is somewhat reduced in diameter to provide a shoulder at 46 against which an eyelet holds the upper ends of the straps comprising blade assembly 45. Where the straps cross at the lower center of blade assembly 45 they are pierced and held together by an eyelet 47 mounted on the end of the tubular shaft 28.

As above noted, the entire assembly comprising the central rod 35, the concentric tubular shaft 28 journaled thereon, the outer concentric tubular shaft 32 which is journaled on shaft 28, and the baffle and the two beaters 45 and 40 which are mounted on such shafts, may all be removed unitarily from the driving member for washing or for replacement by either of the substitute devices shown in Figs. 7, 8 and 9.

When the parts are assembled as shown in Figs 1, 2 and 5, the tubular driven shafts 28 and 32 will not only be rotated in opposite directions but at differing speeds. The ratio of the gear teeth 21 to pinion 30 will be higher than the ratio of gear teeth 22 to pinion 25, so that the outer beater 40 will revolve at a higher speed than beater 45 and in an opposite direction. Since the high speed beater is interposed between a stationary baffle and a relatively low speed beater moving in an opposite direction, an extremely rapid mixing action is secured. At the same time the assembly is exceedingly strong due to the fact that the rod 35 and bearings of the driven pinions provide support for the driven shaft 28 at both sides of the casing, and the driving shaft 17 is likewise provided with two spaced bearing supports at opposite sides of the casing. This arrangement is made possible by the use of the helicoidal gears which permits such shafts to be offset. It is further to be noted that the offset is preferably in such a direction, as viewed in Fig. 1, that when the casing handle is held by the operator's left hand and the crank handle 19 is manipulated by the operator's right hand the offset will be in a direction away from the body of the operator.

The crank handle 19 and the insert used at 50 to complete the handle for the casing may both conveniently be made of plastic. The plastic insert 50 is preferably mounted in the form of a channel having its sides complementary to the horizontal metal portion 51 of the D-shaped handle 11 of the casing. Within the channel-shaped piece 50 there are transverse partitions 52 integral with the metallic member 51 and provided with tapered bores into which the pins 53 integral with the plastic element 50 are receivable with a pressed fit to frictionally retain the plastic member 50 in position as shown.

Where relatively high speed whipping action is desired, the shaft and whipping set shown in Figs. 7 and 8 may be substituted for the beating assembly shown in Figs. 1, 2 and 6. In this set the central rod 35 is identical with that already described, but instead of carrying a baffle at its lower end it simply has a broad terminal support at 55. Upon this rod the shaft 280 is supported to engage the upper pinion 25 but shaft 280, unlike its counterpart 28, carries no beating or mixing mechanism and is simply idle in this assembly as a bearing support between rod 35 and the tubular outer shaft 320. The tubular outer shaft is a counterpart of shaft 32 in its splined engagement with the hub of driven pinion 30 but at its lower end, instead of carrying the beater 40, it is extended to provide an almost flat whipping blade 56 having numerous perforations to adapt it for whipping purposes. The end of the tubular shaft 320 is shouldered to engage the top surface of blade 56 and thence extends at a reduced diameter to receive the blade 56. Washer 57 intervenes between the blade and the foot 55 on rod 35. Said foot has a tubular extension 59 serving as a bushing between rod 35 and shaft 320 as shown in Fig. 7.

Where a relatively low speed and heavy mixing action is required, the assembly shown in Fig. 9 will be used. Here again, the rod 35 is identical with the rod used in the construction shown in Figs. 2 and 5. At its lower end it carries a supporting foot 58. This time the intermediate tubular shaft 281, meshing with pinion 25 as a counterpart of shaft 28, is the driving element, being provided at its lower end with mixing blades

450 somewhat similar to the blade assembly shown at 45 in Fig. 2. The shaft 321 is now idle and simply engages pinion 30 as a support for shaft 281 without performing any driving function.

Thus, by interchanging the various units, I not only provide for the driving of different types of mixing, beating or whipping elements, but I also provide for the operation of the selected driven element at an appropriate speed. The whipping blade 56 is connected to the pinion 30 which operates at high speed. The heavy mixing blade assembly 450 is connected to pinion 36 which operates at a relatively low speed. The general purpose assembly shown in Figs. 1, 2 and 6 is connected to both pinions with its respective beaters driven at differing speeds and in opposite directions as already explained.

I claim:

1. In a mixing device, the combination with a driving head comprising a casing, a driving gear therein and driven pinions provided with aligned mountings fixed in said casing and meshing with said gear, of a mixer assembly comprising tubular shafts at least one of which is in splined connection with a pinion, at least one mixer mounted on the shaft having such splined connection, and a supporting rod extending through said shafts and pinions and supported from opposite sides of the casing, said assembly being bodily removable from said head, together with impositive detent means on said head yieldably engageable with said rod for releasably maintaining the mixer assembly in operative connection with said head.

2. In a mixing device, the combination with a casing having opposite faces and top and bottom bearings, of a drive shaft provided with a gear within the casing and having bearing support from each of said faces, aligned driven pinions meshing with the gear and having bearing support respectively from the top and bottom bearings of said casing, and a driven shaft assembly comprising shaft elements positioned in the respective pinions and mixing means unitarily connected with said elements, at least one of said elements extending across said casing in offset relation to the drive shaft.

3. A mixing device comprising a casing having opposed side bearings and upper and lower bearings, a drive shaft extending across said casing between said side bearings and provided with bearing support therefrom, a duplex gear mounted on said drive shaft and provided with two concentric sets of helicoidal teeth, pinions operatively mounted in the upper and lower bearings of said casing and meshing with the respective sets of teeth of said gear, and a detachable shaft assembly comprising a plurality of shafts in concentric bearing relation, the outermost of said shafts being operatively inserted into the pinion in the lower casing bearing and another of said shafts extending through said outer shaft and lower pinion into operative connection with the pinion in the upper bearing of said casing, said detachable assembly including unitarily mixing means in operative mounting upon said shaft assembly and connected to receive motion from said drive shaft.

4. A device of the character described comprising a casing having opposed side bearings and upper and lower bearings, a drive shaft extending across said casing between said side bearings and provided with bearing support therefrom, a duplex gear mounted on said drive shaft and provided with two concentric sets of helicoidal teeth, pinions operatively mounted in the upper and lower bearings of said casing and meshing with the respective sets of teeth of said gear, and a detachable shaft assembly comprising a plurality of shafts in concentric bearing relation, the outermost of said shafts being operatively inserted into the pinion in the lower casing bearing and another of said shafts extending through said outer shaft and lower pinion into the pinion in the upper bearing of said casing, at least one of said shafts being provided with a tool and being splined to receive motion from the pinion which it engages, together with a rod extending through both of said shafts and both of said pinions, said casing being provided with an impositive detent means releasably engaging the upper end of said rod for detachably maintaining said shafts in assembly with their respective pinions.

5. In a mixing device, the combination with a casing having opposing side bearings and upper and lower bearings, of a drive shaft having upper support from both of said side bearings and extending across said casing transversely, a duplex driving gear upon said shaft, axially aligned driven pinions having fixed supports in the upper and lower bearings and meshing with said gear to receive motion therefrom, and a driven shaft assembly unitarily insertible and removable and comprising nested inner and outer shafts provided with splines releasably engageable with the respective pinions, at least one of said shafts extending across said casing to receive support from said pinions in the upper and lower bearings, and a set of concentric mixing elements carried by the respective shafts, said shaft assembly comprising an inner rod having a stationary support beneath said mixing elements and extending through said shafts and bearings, said casing being provided with impositive detent means releasably engaging said rod, whereby said assembly is detachably retained in said casing with said shafts in operative relation to said pinions.

6. In a mixing device, the combination with a hollow frame open at its opposing sides, of a pair of face plates connected as closures to the sides of said frame and provided with aligned bearings, a drive shaft journaled in said bearings, a driving gear mounted on said shaft and provided with two sets of helicoidal teeth, a pinion meshing with the outer set of teeth and provided with a bearing in said frame, a pinion meshing with the inner set of teeth and provided with a bearing mounted on one of said face plates, said pinion bearings being aligned, and a set of concentric shafts provided with mixing elements and connected with the respective pinions, one of said shafts extending across said frame between said pinions in offset relation to said driving shaft.

7. In a mixing device, the combination with a hollow frame provided with opposing open faces, face plates connected to the prespective faces, at least one of said plates being detachably secured to the frame, a driving shaft journaled in the respective face plates and extending across said frame therebetween, a driving gear mounted on said shaft, driven pinions meshing with said gear and disposed above and below said shaft respectively with their axes in substantial alignment, bearing means provided in said frame for the lower of said pinions, bearing means carried by the removable face plate for the upper of said pinions, thrust means carried by the last mentioned face plate for restraining the lower pinion in its bearing means, thrust means carried by said frame with which the upper of said pinions is engageable to be retained thereby in its bearing means, tubular shafts in concentrically nested relationship provided with spline means releasably engaged with the respective pinions, a rod extending through said shafts, and an impositive detent mounted in said thrust means and with which said rod is engageable, said shafts being provided with mixing elements and said rod having means connecting it in unitary assembly with said shafts to maintain said shafts detachably in operative connection with their respective pinions.

8. A device of the character described, comprising a generally annular frame provided with closure plates applied to its opposite faces, a handle extending upwardly from said frame and a bearing sleeve extending downwardly therefrom in a position offset from the center line of said handle, a drive shaft extending transversely across said frame and provided with bearings in the respective closure plates, a duplex driving gear mounted on said shaft between said bearings and having two concentric sets of helicoidal teeth, said gear being adjacent one of said closure plates, a pinion inserted in said bearing sleeve from the interior of said frame and having a tubular hub portion of non-circular contour, said pinion meshing with the outer row of teeth of said gear, a tubular driven shaft removably engaged in said pinion and having a terminal portion complementary to the non-circular interior of the pinion hub, thrust means carried by the closure plate opposite the gear and positioned to retain said pinion in said bearing sleeve, a bearing boss carried by said last mentioned closure plate and having a bearing opening aligned with the axis of said first pinion, a second pinion having a tubular hub portion of non-circular interior contour, said hub portion being inserted into said bearing boss from above to rotate therein and said second pinion meshing with the inner row of teeth of said gear, a thrust boss in the upper and interior portion of the frame positioned to restrain said second pinion against displacement from said bearing boss, an inner tubular shaft extending through the first tubular shaft and across said frame in offset relation to the driving shaft into detachable connection with said second pinion, said second tubular shaft having a terminal contour complementary to the interior contour of said pinion, a supporting rod extending through both of said shafts into said thrust boss and provided with a terminal groove, a ball detent mounted in the thrust boss and releasably engaged with said groove for the retention of said rod, means assembling said rod as a detachable unit with the respective tubular shafts, and tool means carried by at least one of said shafts.

9. In a device of the character described, the combination with a central rod provided with a stationary supporting foot, of a plurality of tubular shafts concentrically mounted to rotate about said rod and with respect to each other, said tubular shafts having axially spaced terminal portions, at least one of said shafts being provided with a mixing tool and having its terminal portion provided with splined coupling means, said shafts and rod having means maintaining them in assembly to comprise a unit independent of shaft actuating and rod carrying means.

FREDERICK E. SETTE.